United States Patent [19]

Fishbaugh

[11] Patent Number: 4,481,758
[45] Date of Patent: Nov. 13, 1984

[54] HAY RAKE
[75] Inventor: Byron L. Fishbaugh, St. Marys, Ohio
[73] Assignee: The Goodyear Tire & Rubber Company, Akron, Ohio
[21] Appl. No.: 474,616
[22] Filed: Mar. 11, 1983
[51] Int. Cl.³ .......................................... A01D 77/08
[52] U.S. Cl. .................................................... 56/400
[58] Field of Search ......................................... 56/400
[56] References Cited
U.S. PATENT DOCUMENTS

| | | | |
|---|---|---|---|
| 3,157,019 | 11/1964 | Brackbill | 56/400 |
| 3,186,153 | 6/1965 | Breed | 56/400 |
| 3,226,922 | 1/1966 | Luther | 56/400 |
| 3,253,394 | 5/1966 | Johnston | 56/400 |
| 3,253,395 | 5/1966 | Johnston | 56/400 |
| 3,401,515 | 9/1968 | Fishbaugh | 56/400 |
| 3,481,125 | 12/1969 | Miller | 56/400 |
| 3,531,927 | 10/1970 | Wood | 56/400 |
| 3,553,950 | 1/1971 | Waser | 56/400 |
| 3,561,206 | 2/1971 | Fuller | 56/400 |

Primary Examiner—Jay N. Eskovitz
Attorney, Agent, or Firm—Frank Pincelli

[57] ABSTRACT

A hay rake tooth assembly comprising an elastomeric body secured to a mounting bracket, an elongated rake tine having one end embedded in said elastomeric body. The end embedded in said elastomeric body having a bent around portion which provides an elastomeric linking member in said body. The bent around portion extending in substantially a circular arc of at least 270°. The elastomeric body having a cross-sectional configuration as viewed in a plane parallel to the primary direction of deflection such that there is provided more elastomeric material on the side of the body which is placed in tension as opposed to the side which is placed in compression during deflection.

4 Claims, 3 Drawing Figures

HAY RAKE

The foregoing abstract is not to be taken as limiting the invention of this application, and in order to understand the full nature and extent of the technical disclosure of this application, reference must be made to the accompanying drawings and the following detailed description.

BACKGROUND OF THE ART

The present invention relates to rake tooth assemblies used on agricultural implements.

In the prior art, there is a serious problem with tooth breakage due to fatigue with all steel type tooth constructions. Failure of these tooth assemblies of course requires replacement of the part and labor to effectuate replacement which can result in large expenditures. There is also provided in the prior art hay rake tooth assemblies having an elongated tine embedded in an elastomeric body. Rotation by the tine along its axis being a considerable problem.

The present invention provides an improved hay rake tooth assembly which provides improved flex life and durability over the prior art. Additionally, a hay rake tooth of the present invention minimizes or prevents rotation of the tine. This is accomplished by a novel tine and elastomeric body construction.

DETAILED DESCRIPTION OF THE PREFERRED EMBODIMENT

Figure 2:
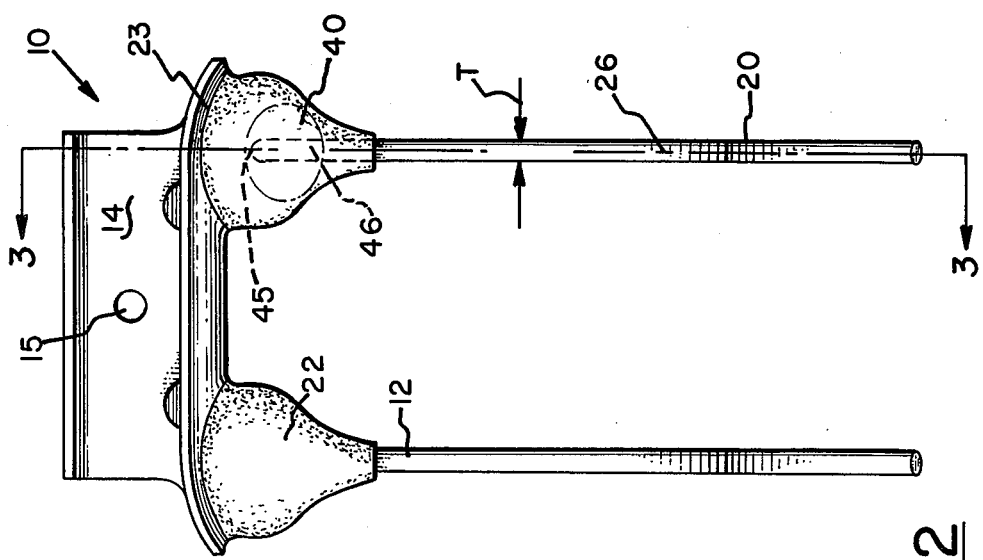
FIG. 2 is a front plan view of a pair of hay rake tooth assemblies made in accordance with the present invention secured to a mounting bracket.
Figure 3:
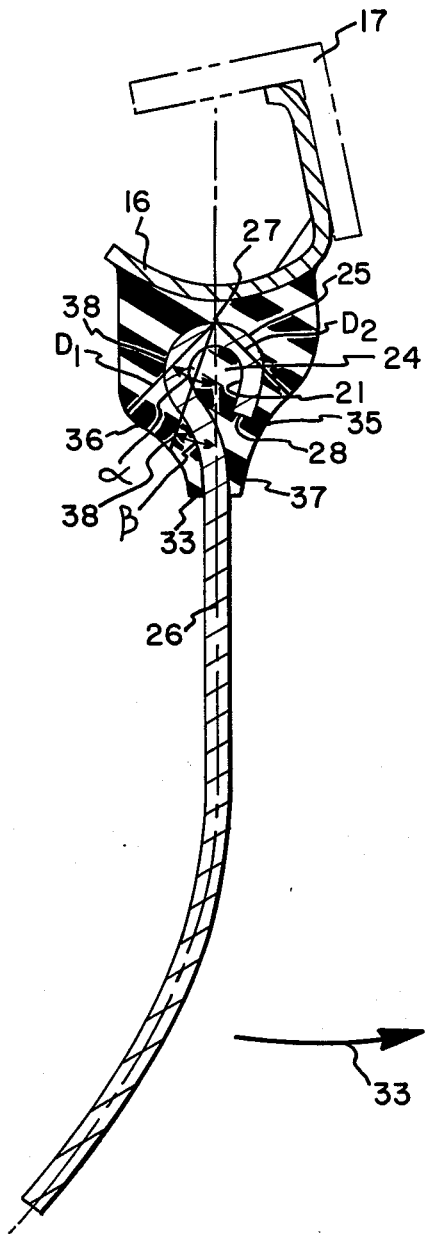
FIG. 3 is a sectional view taken along line 3—3 of FIG. 2.

Referring to FIGS. 2 and 3, there is illustrated a hay rake tooth and mounting assembly 10 which comprises a pair of hay rake tooth assembly 12 which are secured to mounting bracket 14. In the particular embodiment illustrated, each hay rake tooth assembly 12 is bonded to bracket 14. However, the hay rake tooth assemblies may be secured in any manner desired. Further, while the present invention illustrates two hay rake tooth assemblies secured to a single mounting bracket 14, there may be as many as desired. For example there may be one or any plurality so desired. The mounting bracket 14 has an opening 15 for receiving securing means to secure the assembly 10 to the agricultural implement. In the particular embodiment illustrated, a bolt (not shown) is passed through opening 15 and through an opening in mounting bar 17 which is secured to the farm implement. A nut (not shown) is threaded onto the bolt to secure mounting bracket 14 to mounting bar 17.

Each hay rake tooth assembly 12 comprises an elongated tine 20 embedded in an elastomeric body 22. The body 22 has a radially outer surface 23 which is bonded to bracket 14. However, as previously noted, the body may be secured in any desired fashion to bracket 14. As can be seen in FIG. 3 in dash lines the end 25 of tine 20 which is embedded in body 22 is bent in a substantially circular arc for approximately one complete revolution so as to provide a connecting passage for elastomeric body 22 to fill during vulcanization of the body 22, thereby providing a linking member 24 in the body 22. Linking member 24 of elastomeric body 22 completely fills the connecting passage 21. A tine constructed in accordance with the present invention provides a strong mechanical lock between the tine 20 and body 22 and prevents the tine from rotating about its longitudinal axis 26. The passage 21 should be at least as wide as the thickness T of the tine 20. Further, there should be no other obstruction in the passage 21. While in the particular embodiment illustrated the rounded end portion 25 is shown to extend approximately 360°, it is not necessary that portion 25 complete an entire circle. However, it is important that it extend in a substantially circular arc for at least 270° as indicated by terminal point 28. It is important that the curved portion 25 extend at least around 270°, preferably of at least about 315°, so that during the flexing motion of the tine 20 undue stress points are not provided at the terminal end 28 of the rounded portion 25.

Figure 1:
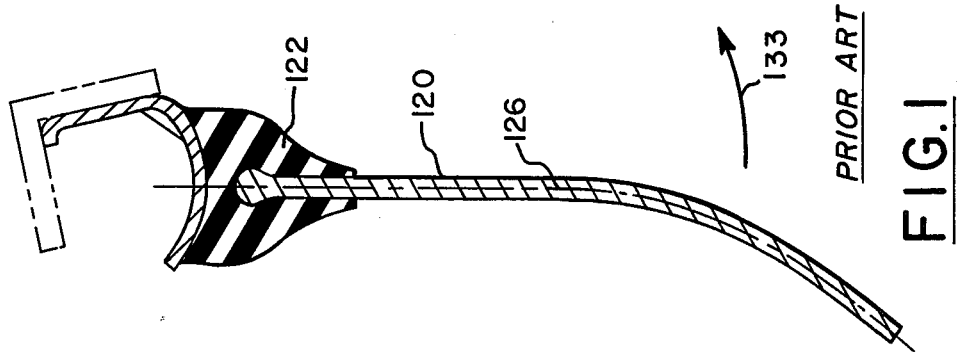
FIG. 1 is a sectional view of a hay rake tooth of the prior art.

The plane in which the hay rake tooth assembly 12 is illustrated in FIG. 3 is the plane in which the tine is primarily deflected as illustrated by arrow 33. It can be seen from this view that the rounded portion 25 is positioned in a plane substantially parallel to the tine deflection. However, the present invention is not so limited. The rounded end portion may be disposed at any angle desired. However, preferably substantially in a plane parallel to the direction at which the tine primarily deflects the terminal end 28 being located in that portion of body 22 which is placed in compression. The cross-sectional configuration of body 22 is designed such that there is provided more elastomeric material on the side of the body 22 which is placed in tension as opposed to the side which is placed in compression during deflection of the tine 20. It is believed that this type of construction improves the durability and flex life of the hay rake tooth assembly. The tine as it is deflected to the right, as indicated by arrow 33, places the rubber on side 35 of body 22 in compression whereas the rubber on side 36 is placed in tension. It is desired to place additional rubber on the side 36 of the body 22 which is placed in tension as opposed to side 35. The cross-sectional thickness of the body 22 as shown in FIG. 3 as taken perpendicular to the longitudinal axis 26 of the tine at top 27 of the rounded portion 25 is substantially equal. From the top of the tine 20 radially toward terminal end 37, the cross-sectional thickness of the body from the tine to the surface 36 gradually becomes greater in thickness as opposed to the cross-sectional thickness of the body from tine 20 to surface 35 such that if you were to draw an angle of approximately 45° from the top 27 of the tine axially outward on both sides the distance $D_1$ from the top of the tine to the surface 36 would be in the range of 10% to 40% greater than the distance $D_2$ from the top of the tine to the surface 35. Preferably, between 15% and 25%. In the particular embodiment illustrated, the distance $D_1$ is about 22% greater than the distance $D_2$. From this point radially outwardly to the end 37, the rubber body as measured from the tine 20 decreases in cross-sectional thickness until approximately reaching an angle $\beta$ of about 30° with the longitudinal axis 26 as indicated by line 38 at which point the cross-sectional thickness of the body as measured from tine 20 to surface 36 is approximately equal to the thickness of body 22 from tine 20 to surface 35. In the particular embodiment illustrated, the cross-sectional thickness as measured from the top of the tine at an angle of 45° on side 35 is approximately 0.75 inches and on the side 36 is approximately 0.92 inches. The dot dash line 39 of FIG. 2 on body 22 illustrates the general region 40 where additional elastomeric material is placed on side 36. The side 36 comprises approximately one-half of the circumference of the body. The region 40 extends around the body 22 a distance no greater than about 180°, in the particular embodiment illustrated the region 40 extends around body 22 for about 160°. Region 40 is placed substantially equidistant about the plane which contains the tine 20 and is parallel to the direction of primary deflection. As can be seen in FIG. 3, the maximum thickness of region 40 occurs at the point on the surface 36 which is approximately at a 45° angle from the top of tine 20 as measured with respect to the longitudinal axis 26 of tine 20. The thickness of region 40 decreases at the radially outer and inner points 45,46 respectively. This is in complete contrast to the hay rake tooth assemblies in the prior art. Referring to FIG. 1, there is illustrated a cross-sectional view of a tooth assembly made in accordance with the prior art similar to that of FIG. 3 wherein the primary direction of deflection is indicated by arrow 133. The body 122 has a cross-sectional shape such that the cross-sectional thickness as measured in any plane perpendicular to the longitudinal axis 126 of tine 120 is substantially equal.

The body 22 should be made of an elastomeric material such that the Shore A hardness is in the range of 60 to 80 and preferably between 65 and 75. Additionally, the material should have an elongation of at least 350%. In the particular embodiment illustrated, the Shore A hardness is approximately 65 and the elongation properties of the material is approximately 365.

While certain representative embodiments and details have been shown for the purposes of illustrating the invention, it will be apparent to those skilled in the art that various changes and modifications may be made therein without departing from the spirit or scope of the invention.

I claim:

1. A hay rake tooth assembly for use on an agricultural rake comprising:
    an elastomeric body having means for securing said hay rake tooth assembly to said agricultural rake;
    an elongated rake tine having one end embedded in said elastomeric body, said end embedded in said elastomeric body having a bent around portion which forms an elastomeric linking member in said elastomeric body, said bent around portion extending in a substantially circular arc of at least 270°, so as to form a connecting passage of elastomeric material having no obstruction therethrough, said elastomeric body having a cross-sectional configuration as viewed in a plane parallel to the primary direction of deflection of said tine and which passes through said tine such that there is provided more elastomeric material on the side of said body which is placed in tension as opposed to the side which is placed in compression, the thickness of said body as measured from the top of said bent around portion to the outer surface of said body portion as measured at an angle of approximately 45° to the longitudinal axis of said tine is in the range of about 15% to 25% greater on the side of said body which is placed in tension in comparison to the side of said body which is placed in compression, the outer surface of said body on the sides which are placed in compression and in tension each have a radially outer convex surface portion connected to a radially inner concave surface portion, the transition point between the convex and concave surface portions being substantially below the top of said bent around portion, the cross-sectional thickness of said body from said point drawn at an angle of approximately 45° from the top of said bent around portion to the radially inner end of the body decreases in cross-sectional thickness until approximately reaching an angle of about 30° at the longitudinal axis of said tine as taken from the top of said bent around portion next, said elastomeric body being made of a material having a Shore A hardness in the range of 60 to 85 and having an elongation of at least 350%.

2. A hay rake tooth assembly according to claim 1 further characterized in that said bent around portion extends in a circular arc of approximately 360°.

3. A hay rake tooth assembly according to claim 1 further characterized in that the additional elastomeric material placed on said side of said body which is placed in tension extends around the circumference of said body a distance no greater than approximately 180° and is disposed substantially an equal distance about the plane which contains said tine and which is parallel to the direction of deflection of said tine, said region being disposed substantially equally a distance about the plane which contains the tine 20 and which is parallel to the direction of primary deflection.

4. A hay rake tooth assembly according to claim 1 further characterized in that the distance from the top of the tine to the side of said body which is placed in compression is approximately 22% greater than the distance from the top of the tine to the side of said body which is placed in compression.

* * * * *